United States Patent Office 2,957,854
Patented Oct. 25, 1960

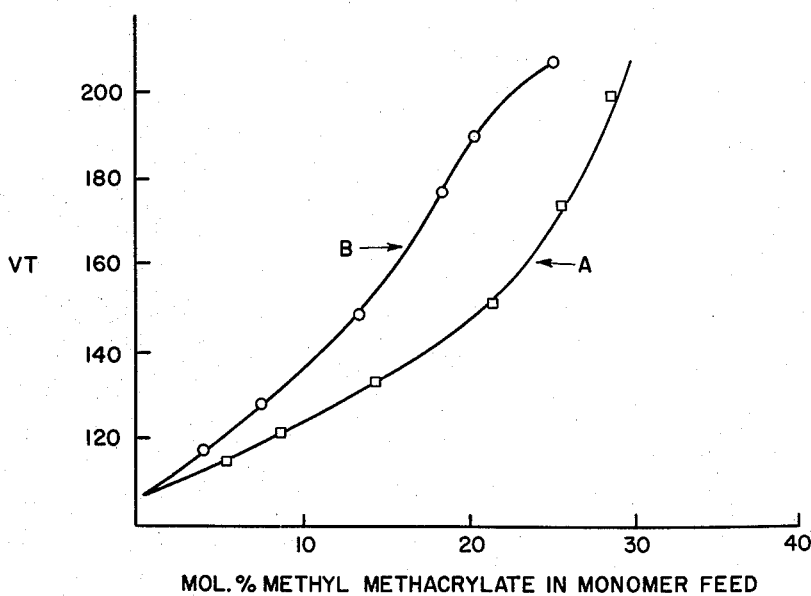

2,957,854

OIL-SOLUBLE COPOLYMERS OF VINYLPYRIDINE AND MIXTURES OF DISSIMILAR ALKYL ACRYLATE

Lyman Edward Lorensen, Orinda, and John Zachar and Robert C. Jones, Berkeley, Calif., assignors to Shell Oil Company, a corporation of Delaware Filed Jan. 31, 1958, Ser. No. 712,389

13 Claims. (Cl. 260—80.5)

This invention relates to new polymeric products. More particularly, the invention relates to a new class of nitrogen-containing copolymers which are particularly useful as detergents, pour point depressants and viscosity index improvers for lubricating compositions.

Specifically, the invention providese new and particularly useful polymeric products comprising non-ash forming oil-soluble copolymers of (1) a vinylpyridine, (2) a mixture of at least two dissimilar esters of an acrylic acid and long chain aliphatic alcohol containing at least 10 carbon atoms, and (3) at least one acrylate ester of a lower aliphatic alcohol of not more than 6 carbon atoms, said copolymers having the vinylpyridine and the total acrylic ester in a mole ratio varying from 1:10 to 2:1 and the acrylate of the lower aliphatic alcohol making up not more than 60 mol percent the total ester, and the molecular weight of the copolymer varying from $5 \times 10^4$ to $2.5 \times 10^6$ as determined by the light scattering method.

This application is a continuation-in-part of our application Serial No. 631,419, filed December 31, 1956.

It is an object of the invention to provide a new class of polymer products. It is a further object to provide new nitrogen-containing oleophilic copolymers and a method for their preparation. It is a further object to provide new vinylpyridine copolymers which are particularly useful and valuable as additives for lubricating compositions. It is a further object to provide new additives for lubricating compositions which act both as ashless detergents and anti-wear agents. It is a further object to provide new vinylpyridine copolymers that are also useful as pour point depressants. It is a further object to provide new polymers when added to lubricating compositions form compositions having outstanding VT properties. These and other objects of the invention will be apparent from the following detailed description thereof.

It has now been discovered that these and other objects may be accomplished by the novel polymeric products of the invention comprising non-ash forming oil-soluble copolymers of (1) a vinylpyridine, (2) a mixture of at least two dissimilar esters of an acrylic acid and long chain aliphatic alcohol containing at least 10 carbon atoms, and (3) at least one acrylate ester of a lower aliphatic alcohol of not more than 6 carbon atoms, said copolymers having the vinylpyridine and the total acrylic ester in a mole ratio varying from 1:10 to 2:1 and the acrylate of the lower aliphatic alcohol making up not more than 60 mol percent of the total ester, and the molecular weight of the copolymer varying from $5 \times 10^4$ to $2.5 \times 10^6$ as determined by the light scattering method. It has been found that these special copolymers are particularly outstanding as additives for lubricating compositions. When they are incorporated into base lubricating compositions, even in very small amounts, they display unexpected detergent properties. Addition of 2% by weight of these polymers, for example, tends to reduce the formation of sludge as much as 70%. In addition, the new copolymers also act to reduce the pour point of the lubricating compositions. Furthermore, the above copolymers also act as VI improvers. Particular advantage over copolymers prepared without the use of the lower acrylates is found in the fact that the new copolymers give lubricating compositions having unexpected improvement in viscosity-temperature properties. Thus, the compositions containing the copolymer without the lower acrylates have VT values of 100–104, while compositions containing the new copolymers have VT values as high as 205. Superiority of the new copolymers in these applications is shown in the examples at the end of the specification.

The vinylpyridines used in making the special copolymers may be exemplified by 2-vinylpyridine, 3-vinylpyridine, 4-vinylpyridine, 2-methyl-5-vinylpyridine, 4-methyl-2-vinylpyridine, 5-ethyl-2-vinylpyridine and 2-butyl-5-vinylpyridine, and the like. Particularly preferred groups comprise 2-, 3- and 4-vinylpyridines and the lower alkyl-substituted derivatives thereof.

The long chain acrylate esters used in the preparation of the new copolymers include the esters of acrylic acids and the long chain aliphatic alcohols. Examples of the acrylic acids include acrylic acid and the alpha-substituted acrylic acids such as methacrylic acid, ethacrylic acid, alpha-phenyl acrylic acid, alpha-cyclohexyl acrylic acid and chloroacrylic acid. The long-chain aliphatic alcohols used in the esterification of these acids may be exemplified by decyl, lauryl, cetyl, stearyl, eicosanyl, nonadecanyl, and the like alcohols and mixtures thereof. Particularly preferred esters to be used are the acrylic acid and methacrylic acid esters of aliphatic monohydric alcohols, and especially alkyl alcohols, containing from 14 to 20 carbon atoms.

Specifiic examples of these long chain acrylic acid esters include, among others, decyl acrylate, lauryl acrylate, stearyl acrylate, decyl methacrylate, lauryl methacrylate, cetyl methacrylate, stearyl methacrylate, eicosanyl acrylate, docosanyl acrylate and the like, and mixtures thereof.

As noted, a mixture of two or more of these long chain acrylate esters is used in making the new copolymers. Illustrative examples of these mixtures include, among others dodecyl methacrylate/octadecyl methacrylate, tetradecyl acrylate/octadecyl methacrylate, decyl methacrylate; octadecyl methacrylate, tetradecyl methacrylate; hexadecyl methacrylate, tetradecyl acrylate/octadecyl methacrylate, dodecyl methacrylate/eicosanyl acrylate, and the like.

In these mixtures, it is highly desirable to have a wide difference in the number of carbon atoms of the alcohol portion. Particularly superior results are obtained when one of the acrylate esters is a $C_{10}$ to $C_{14}$ acrylate ester and the other is a $C_{16}$ to $C_{20}$ acrylate ester.

In these mixtures, the different long chain acrylate esters are employed in mol ratios varying from 1:4:4:1. The superior copolymers are obtained when the higher ester, e.g. those having from 16 to 20 carbon atoms in the alcohol portion, and the lower esters, e.g. those having from 10 to 14 carbon atoms in the alcohol portion are combined in a mole ratio varying from 1:1 to 1:3.

In considering the above mixtures, it should be noted that an ester of acrylic acid or methacrylic acid and technical lauryl alcohol, which is a mixture of straight chain alcohols should not be considered as a mixture of two or more esters of group (2) or that using such an ester would result in a polymeric additive suitable for use in oil compositions of this invention since copolymers of lauryl (technical) methacrylate and a vinylpyridine will not have the required ratio of dissimilar alkyl chains or the average alkyl chain length which is required of polymers of this invention. Rather such copolymers function as simple copolymers and possess the limitations of such esters namely they function as pour point depressants only in specific oils, they tend to break down, form emulsion and cause corrosion. On the other hand, the claimed polymers form excellent pour point depressants, detergents and viscosity index improving additives for use in lubricating oil compositions.

The third type of component used in making the new copolymers is an ester of an acrylic acid and a lower aliphatic alcohol of not more than 6 carbon atoms. Examples of these lower acrylates include, among others the acrylic acid and methacrylic acid esters of methanol, ethanol, butanol, hexanol, isobutyl alcohol and propanol.

This third type of component is used only in certain specific amounts. It has been found that the ester of the acrylic acids and the aliphatic alcohol containing not more than 6 carbon atoms should be employed in less than 60 mol percent of the total acrylate ester mixture, i.e. the total of the mixture of long chain esters and the lower aliphatic monohydric alcohol containing not more than 6 carbon atoms. Preferably the lower acrylate ester is employed in amounts varying from 10% to 30% by weight of the total acrylate ester mixture.

The fact that the new copolymers containing such large amounts of the third type of acrylate ester, i.e. the lower acrylic acid ester, possess the above-noted superior results is indeed surprising in view of the fact that polymers prepared from such lower esters heretofore failed to have many of the above-noted superior properties. The presence of the lower esters is of further advantage in that it brings about an unexpected improvement in viscosity-temperature properties as noted in the working examples.

As the vinylpyridines and the acrylic esters have different polymerization rates, the proportions in which they enter the copolymer molecule will differ from the proportions in which they occur in the reaction mixture. It will be necessary, therefore, to determine beforehand the ratio of concentrations of monomers needed to give copolymers having the two monomers in the necessary ratio. This can be easily accomplished by conducting a few routine runs and examining the composition of the resulting copolymer. The initial concentration of monomers can then be adjusted so as to give the copolymer of the desired composition.

As the reaction progresses, the monomer concentration ratios change due to the difference in the rate of polymerization and, in some cases, the ratio will change so that it will not be producing copolymers having the monomers in the desired ratio. The superior products, are, therefore, obtained by employing some steps during the copolymerization which will insure that the ratio of concentrations of monomers does not vary during the reaction period from the above-described limits. This may be accomplished in a variety of ways. One way, for example, comprises stopping the copolymerization after the ratio of the monomer concentrations has reached the limiting value. This method is of particular value if the change in the ratio between the monomer concentrations during copolymerization is slow and a considerable yield of copolymer has been obtained before the limiting values have been attained.

Another method is to adjust the ratio between the monomer concentrations by adding monomer during the course of the polymerization. In this case, it is usually sufficient to add the monomer which is consumed the fastest. Such additions may be periodic or continuous.

Control over the change of ratio can be made by periodic withdrawal of samples and analyzing the product, or can be made in a homogeneous system by simply observing a physical property of the mixture which varies with the ratio of concentrations of monomers, such as boiling point, refractive index, vapor pressure, specific gravity and the like, and adding the monomer or monomers so as to bring the value up to the predetermined level for the desired product.

Copolymers of the present invention which have the superior properties noted above are those having molecular weights between 50,000 and 2,500,000 as determined by the light scattering technique described in Chem. Rev., vol. 40, page 319 (1948). Preferably, the molecular weights range from about 75,000 to 1,000,000 and more preferably from 100,000 to 650,000.

Any suitable conditions may be employed to maintain the molecular weight within the desired range. Factors which exert an influence on the molecular weight of the polymer include the method of polymerization (e.g., polymerization in emulsion, suspension, solvent solution or bulk), the nature and concentration of the catalyst employed, the temperature, and nature and amount of the monomers. When the polymerization is accomplished in solution, the molecular weight of the product will be lower when the dilution is stronger, i.e., when the concentration of solvent is greater. With the same catalyst, the higher polymerization temperature tends to give lower molecular weights.

Polymerization initiators that are particularly suited for use in preparing the claimed copolymers include various free-radical yielding catalysts as peroxide catalysts, such as, for example, benzoyl peroxide, lauroyl peroxide, tertiary butyl hydroperoxide, 2,2-bis(tertiary butyl peroxy) butane, di(tertiarybutyl) peroxide, tertiary butyl perlargonate, hydrogen peroxide, sodium or potassium persulfate, percarbonate, peracetic acid and the like. Other suitable catalysts include sodium bisulfite, diethyl sulfoxide, azo compounds, such as alpha, alpha-azodiisobutyrlonitrile and the like. The amount of the initiator added may vary over a considerable range. In general, the amount of initiator added will vary from 0.1% to 5% by weight of the material being polymerized. Preferred amounts vary from 0.1% to 2% by weight.

The temperature selected is important relative to the VT properties desired. For a given lower acrylate content, the higher temperatures give lower VT values. Preferred temperatures range from 40° C. to 90° C. As shown in Example XVIII temperatures up to 120° C. or even up to 160° C. may be used but give lower VT values.

The polymerization may be conducted in the presence or absence of air. In most cases, however, it has been found desirable to conduct the polymerization in the absence of air, e.g., in the presence of an inert gas such as nitrogen. Atmospheric, reduced or superatmospheric pressure may be employed.

At the end of the polymerization, any unreacted monomer or monomers and/or solvents may be removed, preferably by distillation or by precipitation with appropriate solvents.

The copolymers of the present invention are substantially water-white to light colored viscous liquids to soft rubbery solids. They possess unexpected solubility and surface active properties which could not have been predicted and which enable them to be used for a wide variety of important applications. It has been found, for example, that the new polymers are particularly valuable as ashless detergents and anti-wear agents for lubricating oils and lubricating compositions and/or as pour point depressants and VI improvers. They are especially outstanding in these applications as they are readily soluble in the oils and compositions and when added even in small amount act to reduce wear, prevent formation of sludge and lower the pour point. Addition of 2% by weight of these polymers, for example, tend to reduce wear 40 to 50%, reduce the formation of sludge as much as 70%. The addition of the new copolymers also lower the pour point 30 degrees or more, and increase the VI values at least 1.5 and increase the VT properties.

The lubricating stocks used for this purpose may be any natural or synthetic material having the desired lubricating properties. Thus, it may be a hydrocarbon oil obtained from a paraffinic, naphthenic, asphaltic or mixed base crude, and/or mixtures thereof. The viscosity of these oils may vary over a wide range such as from 100 SUS at 100° F. to 100 SUS at 210° F. The hydrocarbon oils may be blended with fixed oils, such as castor oil, lard oil and the like and/or with synthetic lubricants such as polymerized olefins, copolymers of alkylene glycols and alkylene oxides, organic esters, e.g., 2-ethylhexyl sebacate, dioctyl polymers, e.g., dimethyl silicone polymer and the like.

Mineral lubricating oils which are particularly desirable for use in compositions of the invention can be obtained from West Texas Ellenburger crudes, East Texas crudes, Oklahoma crudes, California crudes. A useful solvent refined East Texas mineral lubricating oil had the following properties:

Pour point, °F. _____ +10
Viscosity centistokes at 100° F. _____ 27
Viscosity index _____ 95

If desired, the synthetic lubricants may be used as the sole base lubricant or admixed with fixed oils and derivatives thereof. In addition, the base can be gasoline, ethyl fluids, fuel oils, greases, etc.

The novel copolymers are effective in the lubricating compositions in ranges varying from about 0.01% to about 10% and preferably from about 0.1% to 5% by weight of the oil.

In addition to the above-described novel copolymers, the lubricating oil compositions may be modified with other additives such as other pour point depressants, other viscosity index improvers, corrosion inhibitors, extreme pressure additives, anti-oxidants and the like. Among such materials are VI and pour point agents, e.g., high molecular weight polymers, e.g., "Acryloids"; wax naphthalene condensation products, isobutylene polymers, alkylstyrene polymers; corrosion inhibitors, e.g., inorganic and organic nitrites such as NaNO₂ or LiNO₂ and diisopropylammonium nitrite or dicyclohexylammonium nitrite, metal organic phosphates, e.g., Ca or Zn dicylohexylthiophosphate or methylcyclohexylthiophosphate; extreme pressure agents such as organic phosphites, phosphates and phosphonates, organic sulfides; anti-oxidants such as phenols and amines, e.g., octadecylamine, 26-ditert-butyl-4-methylphenol and the like.

To illustrate the manner in which the invention may be carried out, the following examples are given. It is to be understood, however, that the examples are for the purpose of illustration and the invention is not to be regarded as limited to any of the specific materials recited therein. Unless otherwise specified, parts disclosed in the examples are parts by weight.

In the examples, the molecular weights were determined by light scattering method and the ratio of vinylpyridines to alkyl ester was determined by analysis for nitrogen.

The tests run on the lubricating oil compositions containing the copolymers are described below:

I FL-2 Engine Test—CRC Handbook
II Cold Sludge Test (Chev. Engine)
  Test Conditions: 15 and 6 hour cyclic periods consisting of 30 minutes cyclic followed by 1½ hour cooling period.
  Speed: 600 r.p.m. idle; 1600 r.p.m. cruise.
  Time: 27 hours (15 hours cyclic, 3 hours cruise, 6 hours cyclic, 3 hours cruise).
  Oil Temp.: cyclic—7 to 66° C.
  Jacket Temp. in: cyclic—18 to 69° C.; out: 30 hours cruise 74° C.
  Fuel: Automotive.
  Oil req: 2 gal.
  Oil change: 4 qt.
III Ford EX-3 Type Test
  Conditions:

| Cycle Time | Speed | B.H.P. | Jacket Temp., °F. |
|---|---|---|---|
| 2 hrs | 500 r.p.m. idle | 0 | 125 |
| 2 hrs | 2,500 | 45 | 100 |
| 2 hrs | 2,500 | 45 | 200 |

16 of these 6 hour cycles for 96 hours total time.
Oil required—5 qt., no make up.

IV Lauson Engine Test (LH-L2)
  Conditions:
    Speed (r.p.m.) _____ 1050
    Load (h.p.) _____ 0.8
    Test (hrs.) _____ 60
    Oil Temp., ° F. _____ 225
    Jacket Temp., ° F. _____ 275
    Oil req., ml. (SAE 30) _____ 2000
    Oil change, ml. _____ 1020

V High-Temperature Detergency Test: The high-temperature detergency is determined by measuring the electrical resistance of dispersions of 10% by weight carbon dispersal in a test oil. The "degree of deflocculation" is calculated as the ratio of resistance of the given system to the resistance of an undoped oil containing the same amount of carbon black, and at a constant temperature.

VI Pour Point, ° F. (D-396-39T).

VII Viscosity Temperature (R) determined by taking the viscosity of the composition at 100° F. (cs.) and dividing it by the viscosity at 210° F. (cs.).

VIII Wear Test: 144 ml of 0.1N H₂SO₄ is added to 36 ml. of test lubricant and heated to 50° C. and stirred at a constant speed for 4 hours. Cast iron strips which are immersed in the test solution for the duration of the test, were weighed before and after test and weight loss in grams determined.

IX Thrust Bearing Corrosion and Oxidation Test: According to National Petroleum News, September 17, 1941, R-294 and Ind. and Eng. Chem. vol. 34, p. 183.

The novel polymer additives are effective in the lubricating compositions in ranges varying from about 0.1% to about 10% and preferably from about 1% to 5% by weight of the oil.

The following examples illustrate polymer additives which are useful in compositions of the invention:

EXAMPLE I

A mixture of 2.52 mol of stearyl methacrylate, 5.04 mol of lauryl methacrylate, 0.83 mol of methyl methacrylate and 1 mol of 2-methyl-5-vinylpyridine and 0.2% wt. of alpha, alpha'-azodiisobutyronitrile dissolved in a minor amount of acetate for solubility was placed in a reaction vessel and reacted for about 24–48 hours at 65° C. with stirring in a nitrogen atmosphere. The polymer was then dispersed in equal volumes of benzene and thereafter precipitated with 5–10 volumes of a mixture of acetone and methanol. This was repeated and a stearyl methacrylate/lauryl methacrylate/methyl methacrylate/2-methyl-5-vinyl-pyridine polymer having a nitrogen content of 0.60% by weight and a molecular weight in excess of 750,000 was recovered.

Following essentially the procedure of Example I, other polymers are prepared from monomer mixtures in the molar proportions as shown in Table I.

Table 1

| Example | SMA | LMA | MMA | BMA | MVP | EVP [1] |
|---------|------|------|------|------|-----|-----|
| II | 2.24 | 4.48 | 1.86 | | 1 | |
| III | 2.24 | 4.48 | | 1.86 | 1 | |
| IV | 2.05 | 3.92 | 2.43 | | 1 | |
| V | 2.05 | 3.92 | | 2.43 | 1 | |
| VI | 1.68 | 3.36 | 3.36 | | 1 | |
| VII | 1.68 | 3.36 | | 3.36 | 1 | |
| VIII | 1.40 | 2.80 | 4.2 | | 1 | |
| IX | 1.40 | 2.80 | | 4.2 | 1 | |
| X | 1.12 | 2.24 | 5.04 | | 1 | |
| XI | 1.12 | 2.24 | | 5.04 | 1 | |
| XII | 2.52 | 5.04 | 0.83 | | | 1 |
| XIII | 2.24 | 4.48 | | 1.86 | | 1 |
| XIV | 2.05 | 3.92 | 2.43 | | | 1 |
| XV | 2.05 | 3.92 | | 2.43 | | 1 |

[1] SMA=Stearyl methacrylate. LMA=Lauryl methacrylate. MMA=Methyl methacrylate. BMA=Butyl methacrylate. MVP=2 methyl-5-vinylpyridine. EVP=5 ethyl-2-vinylpyridine.

Other examples of useful polymers for the purpose of the invention include: dodecyl acrylate/stearyl acrylate/ethyl methacrylate/vinylpyridine; hexadecyl methacrylate/stearyl methacrylate/propyl methacrylate/2-methyl-5-vinylpyridine, lauryl methacrylate/stearyl methacrylate/ethyl methacrylate/5-ethyl-2-vinylpyridine and decyl methacylate/octadecyl methacrylate/butyl methacrylate/vinyl pyridine in which the mol ratios of the total ester mixture to the vinylpyridine are ratios of from 1:2 to 10:1, respectively, and in which the amounts of methyl, ethyl, propyl or butyl acrylate or methacrylate in the ester mixtures are amounts of from 10 to 60 and preferably from 15 to 45 mol percent of the total ester mixture.

The above copolymers are added to lubricating oil as shown in the table below. The resulting compositions had good wear resistance, good detergency properties, low pour point, good VI properties and good VT properties.

The pour point and viscosity temperature properties which additives of this invention impart to mineral oil are shown by the data in Table II.:

Table II

[Base oil-mixture of 80% 100 neutral and 20% 250 neutral, pour point= +10, VI=95]

| Additive | Amount, percent wt. | Pour Point, °F. (ASTM-D-97-47) | VT [1] |
|----------|---------|---------|-----|
| Example I | 1.5 | −45 | 115 |
| Example II | 1.5 | −45 | 126 |
| Example III | 2 | −45 | 116 |
| Example IV | 2 | −45 | 149 |
| Example V | 2 | −45 | 122 |
| Example VI | 2 | −45 | 178 |
| Example VII | 2 | −45 | 131 |
| Example VIII | 2 | −35 | 205 |
| Example IX | 2 | −40 | 142 |
| Example XI | 2 | −10 | 172 |
| Polymer SMA/LMA/MVP (2.8/5.6/1) | 2 | −45 | 104 |
| Copolymer of LMA/MVP (1.7/1) | 2 | +15 | 104 |
| Copolymer of SMA/MVP (4.3/1) | 2 | +20 | 104 |

[1] $VT = \dfrac{210° \text{ F. blend} - 210° \text{ F. base oil}}{\dfrac{210° \text{ F. base oil}}{100° \text{ F. blend} - 100° \text{ F. base oil}}} \times 100$ $\dfrac{}{100° \text{ F. base oil}}$

EXAMPLE XVI 29.3% stearyl methacrylate, 49.7% lauryl methacrylate, 16% methyl methacrylate and 5.0% methyl vinylpyridine were charged to a 300-gallon stainless steel autoclave. A 50/50 mixture of benzene and neutral petroleum oil was then added to the autoclave so as to furnish 1 part of the mixture per 3 parts of the total monomer. 0.25% of di-tert-butyl peroxide was then added and the mixture heated at 120° C. for about seven hours.

At the completion of the reaction, the benzene was stripped off to final conditions of 120° C. and 10 mm. Hg with nitrogen sparging. The benzene-free product was then diluted with neutral oil to a polymer content of about 30% by weight and filtered at 100–120° C.

The above oil solution of the polymer was then added to base oil which was a mixture of 80% 100 neutral and 20% 250 neutral having a pour point of +10 and VI of 95. The oil was added so as to furnish from 1.5% to 2% of the copolymer. The resulting mixture had a pour point of −40° F. and a VT of 155.

EXAMPLE XVII

Example XVI was repeated with the exception that the percent by weight of methyl methacrylate in the feed mixture was varied from 10% to 30%. The resulting copolymers were then added to the base oil as in the preceding example. The VT values for the resulting compositions are shown in Figure I as line A.

EXAMPLE XVIII

Example XVII was repeated with the exception that the catalyst was as in Example I and the temperature was 65° C. The resulting copolymers were then added to the base oil as in the preceding example. The VT values for the resulting compositions are shown in Figure I as line B. As evident from the graph, for a given methyl methacrylate content, higher VT values are obtained by using lower temperatures.

EXAMPLE XIX

Example XVI is repeated with the exception that the methyl methacrylate is replaced by hexyl acrylate. Lubricating oils containing the copolymer have good VT properties.

EXAMPLE XX

Example XVI is repeated with the exception that the methyl methacrylate is replaced with butyl acrylate. Lubricating oils containing the resulting copolymer have good VT properties.

We claim as our invention:

1. An oil-soluble copolymer possessing detergent, pour point and viscosity temperature improving properties, which is a copolymer of the three groups of polymerizable monomers: (1) a vinylpyridine, (2) a mixture of at least two esters of an acid of the group consisting of acrylic acid and alpha-substituted acrylic acids and long chain aliphatic alcohol containing at least 10 carbon atoms, one of said esters being an ester of one of the aforedescribed acids and a long chain aliphatic alcohol containing at least 10, but less than 16 carbon atoms, and another ester being an ester of one of the aforedescribed acids and a long chain aliphatic alcohol containing at least 16 carbon atoms, in the mole ratio varying from 1:4 to 4:1 and (3) at least one ester of an acrylic acid and a lower alkanol containing no more than 6 carbon atoms, said copolymer having vinylpyridine and the total ester mixture in a mole ratio of 1:10 to 2:1 with the lower alkyl ester making up not more than 60 mol percent of the total ester mixture, and the said copolymer having a molecular weight varying from $5 \times 10^4$ to $2.5 \times 10^6$ as determined by the light scattering method.

2. An oil-soluble copolymer possessing detergent, pour point and viscosity temperature improving properties, which is a copolymer of the three groups of polymerizable monomers: (1) a vinylpyridine, (2) a mixture of at least two esters of an acid of the group consisting of acrylic acid and alpha-substituted acrylic acids and long chain aliphatic alcohol containing from 10 to 20 carbon atoms, one of said esters being an ester of one of the aforedescribed acids and a long chain aliphatic alcohol containing at least 10, but less than 16 carbon atoms, and another ester being an ester of one of the aforedescribed acids and a long chain aliphatic alcohol containing at least 16 carbon atoms, in the mole ratio varying from 1:4 to 4:1 and (3) at least one ester of an acrylic acid and a lower alkanol containing from 1 to 4 carbon atoms, said copolymer having vinylpyridine and the total ester mixture in a mole ratio of 1:10 to 2:1 with the lower alkyl ester making up from 10 to 60 mol percent of the total ester mixture, and the said copolymer having a molecular weight varying from 50,000 to 2,000,000.

3. A non-ash forming oil-soluble copolymer possessing detergent, pour point and viscosity temperature improving properties, which is a copolymer of the three groups of polymerizable monomers: (1) a vinylpyridine of the group consisting of pyridines substituted on one of the ring carbon atoms with, as the sole substituted substituent, a vinyl group, and the aforedescribed vinylpyridines having a $C_1$ to $C_4$ alkyl group substituted on the ring carbon atoms, (2) a mixture of a $C_{16}$ to $C_{20}$ alkyl ester of an acid of the group consisting of acrylic acid and alpha-substituted acrylic acids, and a $C_{10}$ to $C_{14}$ alkyl ester of an acid of the group consisting of acrylic acid and alpha-substituted acrylic acids which esters are in a mole ratio varying from 1:1 to 1:3, and (3) a $C_1$ to $C_6$ alkyl ester of an acrylic acid of the group consisting of acrylic acid and methacrylic acid, said $C_1$ to $C_6$ alkyl ester making up from 10 to 60 mol percent of the total acrylic acid ester, said copolymer having the vinylpyridine and the combined acrylic acid esters in a mole ratio varying from 1:10 to 2:1 and a molecular weight from $5 \times 10^4$ to $2.5 \times 10^6$.

4. A copolymer as in claim 3 wherein the vinylpyridine is 2-methyl-5-vinylpyridine.

5. A copolymer as in claim 3 wherein the long chain acrylic acid esters are a mixture of stearyl methacrylate and lauryl methacrylate.

6. A copolymer as in claim 3 wherein the vinylpyridine is 4-vinylpyridine.

7. A copolymer as in claim 3 wherein the lower alkyl acrylate ester is methyl methacrylate.

8. A copolymer as in claim 3 wherein the lower alkyl acrylate ester is butyl acrylate.

9. A copolymer as in claim 3 wherein the lower alkyl acrylate is butyl methacrylate.

10. A copolymer as in claim 3 wherein the vinylpyridine is 5-ethyl-2-vinylpyridine.

11. An oil-soluble copolymer possessing detergent, pour point and viscosity temperature improving properties, which is a copolymer of the three groups of polymerizable monomers: (1) a vinylpyridine, (2) a mixture of lauryl and stearyl methacrylate, in the mole ratio varying from 1:4 to 4:1 and (3) methyl methacrylate, the said copolymer having the vinylpyridine and total acrylate esters in a mole ratio of about 1:10 to 2:1, the amount of the methyl methacrylate being 25 to 45 mol percent of the total acrylate esters, and the copolymer having a molecular weight varying from about 100,000 to 2,000,000 as determined by the light scattering method.

12. An oil-soluble copolymer possessing detergent, pour point and viscosity temperature improving properties, which is a copolymer of the three groups of polymerizable monomers: (1) 2-methyl-5-vinylpyridine, (2) a mixture of lauryl and stearyl methacrylate, in the mole ratio varying from 1:4 to 4:1 and (3) methyl methacrylate, the said copolymer having the vinylpyridine and total acrylate esters in a mole ratio of about 1:10 to 2:1, the amount of the methyl methacrylate being 25 to 45 mol percent of the total acrylate esters, and the copolymer having a molecular weight varying from about 100,000 to 2,000,000 at determined by the light scattering method.

13. An oil-soluble copolymer possessing detergent, pour point and viscosity temperature improving properties, which is a copolymer of the three groups of polymerizable monomers: (1) 2-methyl-5-vinylpyridine, (2) a mixture of lauryl and stearyl methacrylate, in the mole ratio varying from 1:4 to 4:1 and (3) methyl methacrylate, the said copolymer having the vinylpyridine and total acrylate esters in a mole ratio of about 1:10 to 2:1, the amount of the methyl methacrylate being 10 to 30 mol percent of the total acrylate esters, and the copolymer having a molecular weight varying from about 100,000 to 2,000,000 as determined by the light scattering method.

References Cited in the file of this patent

UNITED STATES PATENTS 2,828,221    McWherter et al. _____ Mar. 25, 1958